(12) United States Patent
Meine et al.

(10) Patent No.: US 6,432,892 B2
(45) Date of Patent: Aug. 13, 2002

(54) CLEANING OF FRUIT, VEGETABLES, AND MEATS COMPRISING ALKYL-POLYGLYCOSIDE

(75) Inventors: Georg Meine, Mettmann; Brigitte Giesen; Kerstin Ziganke, both of Duesseldorf, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/822,301

(22) Filed: Mar. 28, 2001

(30) Foreign Application Priority Data

Mar. 28, 2000 (DE) .......................................... 100 15 126

(51) Int. Cl.⁷ .............................................. C11D 17/00

(52) U.S. Cl. ........................ 510/111; 510/422; 510/470; 426/478

(58) Field of Search .................................. 510/111, 470, 510/422; 426/478

(56) References Cited

FOREIGN PATENT DOCUMENTS

| WO | WO98/07331 | 3/1995 |
|---|---|---|
| WO | WO95/12326 | 5/1995 |
| WO | WO97/01288 | 1/1997 |
| WO | WO97/01289 | 1/1997 |
| WO | WO97/01290 | 1/1997 |
| WO | WO97/15202 | 5/1997 |
| WO | WO98/18352 | 5/1998 |

OTHER PUBLICATIONS

K. H. Wallhaeusser, *Praxis der Sterilisation, Desinfektion–Konservierung: Keimidentifizierung–Betriebshygiene*, (1995, 5$^{th}$ Ed) (table of contents only).

*Primary Examiner*—Necholus Ogden
(74) *Attorney, Agent, or Firm*—Stephen D. Harper; Glenn E. J. Murphy

(57) ABSTRACT

A low-foaming clear composition for cleaning fruit, vegetables, or meat that can be diluted by the user before use and/or directly sprayed on and that shows high cleaning performance, particularly in dissolving wax, and also high wetting power. The compositions contain $C_{4-9}$ alkyl polyglycosides.

22 Claims, No Drawings

CLEANING OF FRUIT, VEGETABLES, AND MEATS COMPRISING ALKYL-POLYGLYCOSIDE

CROSS-REFERENCE TO RELATED APPLICATIONS

This application claims priority under 35 U.S.C. §119 of DE 100 15 126.4, filed Mar. 28, 2000 in the German patent office, the entire disclosure of which is hereby incorporated by reference.

FIELD OF THE INVENTION

This invention relates generally to the cleaning of fruit and vegetables.

BACKGROUND OF THE INVENTION

It is generally known and recognized among consumers that fruit and vegetables should be thoroughly washed before eating to remove dirt and other unwanted residues which can undesirably adhere to their surfaces. In addition, some consumers like to remove the artificial "wax-like" coating which is applied to some fruit in order to delay the loss of moisture for an extended life and to improve appearance. A majority of consumers are aware of the need for thorough cleaning but generally use only tap water for this purpose. Only a small percentage of consumers use a domestic cleaner—normally a manual dishwashing detergent—to achieve more thorough cleaning. However, dishwashing detergents are only suitable to a limited extent for this application because they are generally characterized by vigorous foaming and a stable foam which makes them difficult to remove from the fruit and vegetables washed with them. The formulation of really effective compositions for cleaning fruit and vegetables, particularly those which can be safely used by individual consumers, also represents a particular problem insofar as many known cleaning ingredients do not appear suitable for use in direct contact with foods from which they might not be able to be completely removed again.

In addition, it would be particularly desirable to provide effective, toxicologically safe compositions for cleaning fruit and vegetables in the form of substantially low-foaming liquid solutions which are clear or at least only very slightly cloudy. Liquid solutions are convenient for the user because they can be directly applied to "dirty" fruit and vegetables and then rinsed off with tap water. The clarity of the liquid signifies cleanliness to the user and is thus particularly desirable. The low foaming is another important attribute which guarantees quick and easy removal of the solution by rinsing. In addition, it would be of advantage if such compositions could be formulated as concentrates which can be diluted by the consumer before use and/or sprayed directly onto the fruit and vegetables.

In addition, many toxicologically safe cleaning ingredients do not meet the above-mentioned need for clear, low-foaming, dilutable liquid products. Thus, many surfactants form cloudy or even opaque suspensions in water. Moreover, many surfactants are actually formulated to be high-foaming. Also, concentrated surfactants form phases that are relatively difficult to handle.

Water-based compositions for cleaning fruit and vegetables which contain oleic acid or oleate are known from International patent applications WO 95/12326 A1, WO 97/01288 A1, WO 97/01289 A1, WO 97/01290 A1, WO 97/15202 A1 and WO 98/18352 A1. $C_{10-18}$ alkyl polyglucosides are disclosed as optional nonionic surfactants. Unfortunately, the compositions in question tend to cloud undesirably in both concentrated and dilute form, particularly where they are used with hard water.

The problem addressed by the present invention was to overcome some or all of the difficulties mentioned above and to provide a clear composition for cleaning fruit and vegetables which would develop high cleaning performance, particularly in removing waxes, and wetting power and which would remain clear even in the presence of hardness elements introduced into the cleaning process both via water and via the dirt on the fruit/vegetables to be cleaned.

This problem is surprisingly solved by the use of $C_{4-9}$ alkyl polyglycosides.

DESCRIPTION OF THE INVENTION

Accordingly, the present invention relates to the use of one or more $C_{4-9}$ alkyl polyglycosides for cleaning fruit and/or vegetables.

Accordingly, in a second embodiment, the present invention relates to a water-based composition suitable for cleaning fruit and/or vegetables containing one or more $C_{4-9}$ alkyl polyglycosides.

The composition according to the invention is also suitable for cleaning meat. Accordingly, in a third embodiment, the present invention relates to the use of a composition according to the invention for cleaning fruit, vegetables and/or meat.

In the context of the teaching according to the invention, fruit is understood in particular to be the fruit—edible raw—of perennial trees and bushes growing wild or in plantations.

Vegetables in the context of the teaching according to the invention are understood in particular to be any annual plants or parts thereof which are used raw or processed for human nutrition.

Meats in the context of the teaching according to the invention are understood in particular to be any parts of animals, for example ungulates, such as cattle or pigs, and of fowl, fish and other saltwater and freshwater animals.

Substances which also serve as ingredients of cosmetic preparations may be referred to in the following by their names under the INCI nomenclature (INCI=*International Nomenclature of Cosmetic Ingredients*). Chemical compounds bear an INCI name in English while vegetable ingredients are all referred to by their Latin names according to Linné, so-called trivial names such as "water", "honey" or "sea salt" also being shown in Latin. The INCI names can be found in the International Cosmetic Ingredient Dictionary and Handbook—7th Edition (1997) which is published by the Cosmetic, Toiletry and Fragrance Association (CTFA), 1101 17th Street, NW, Suite 300, Washington, D.C. 20036, USA and which contains more than 9,000 INCI names and references to more than 37,000 commercial names and technical names, including the associated distributors from more than 31 countries. The *International Cosmetic Ingredient Dictionary and Handbook* assigns the ingredients to one or more chemical classes, for example *Polymeric Ethers*, and one or more functions, for example *Surfactants—Cleansing Agents*, which in turn are explained in detail and to which reference may also be made in the following.

The initials CAS mean that the following sequence of digits is a reference number of the Chemical Abstracts Service.

Unless otherwise stated, the embodiments of the invention described in the following always relate to all three subjects of the invention, i.e. uses, compositions and procedures, even when they are explicitly disclosed for only one subject, for example a composition or a use.

In selecting the ingredients to be used, the expert routinely takes into account the requirements arising from the particular application envisaged for the composition.

Alkyl Polyglycosides

The short-chain $C_{4-9}$ alkyl polyglycosides (APG-I) essential to the invention preferably correspond to general formula I:

$$R^1O(AO)_{a1}[G]_{x1} \qquad (I)$$

in which
- $R^1$ is a linear or branched, saturated or unsaturated alkyl group containing 4 to 9, preferably 5 to 9, more preferably 6 to 9, most preferably 7 to 9 and, in one most particularly preferred embodiment, 8 to 9 carbon atoms,
- [G] is a glycosidic sugar unit, more particularly a glucose unit,
- x1 is a number of 1 to 10, preferably 1.1 to 3, more preferably 1.2 to 2, most preferably 1.3 to 1.8 and, in one most particularly preferred embodiment, 1.4 to 1.6,
- AO is a $C_{2-4}$ alkyleneoxy group, preferably an ethyleneoxy and/or propyleneoxy group and more preferably an ethyleneoxy group and a1 stands for the average degree of alkoxylation of 0 to 20, preferably 0 to 10, more preferably 0 to 5 and most preferably 0.

The group $(AO)_{a1}$ may also contain different alkyleneoxy units, for example ethyleneoxy and propyleneoxy units, in which case a1 stands for the average total degree of alkoxylation, i.e. the degree ethoxylation and the degree of propoxylation added together. The alkyl group $R^1$ is preferably saturated and more particularly saturated and linear. Unless indicated in detail or otherwise indicated in the following, the alkyl groups $R^1$ of the APG-I are linear saturated groups with the indicated number of carbon atoms.

Alkyl polyglycosides (APGs) are nonionic surfactants and represent known substances which may be obtained by the relevant methods of preparative organic chemistry. The index x1 indicates the degree of oligomerization (DP degree), i.e. the distribution of mono- and oligoglycosides, and is a number of 1 to 10. Whereas x1 in a given compound must always be an integer and, above all, may assume a value of 1 to 6, the value x1 for a certain alkyl oligoglycoside is an analytically determined calculated quantity which is generally a broken number. Alkyl glycosides having an average degree of oligomerization x1 of 1.1 to 3.0 are preferably used. Alkyl—glycosides having a degree of oligomerization of less than 1.7 and, more particularly, between 1.2 and 1.6 are preferred from the applicational point of view. The glycosidic sugar used is preferably xylose but especially glucose.

The alkyl group $R^1$ may be derived from primary alcohols containing 4 to 9 carbon atoms. Typical examples are caproic alcohol, caprylic alcohol and nonyl alcohol and mixtures thereof or the technical mixtures containing them which are obtained as linear alcohols, for example in the hydrogenation of technical fatty acid methyl esters, or as branched alcohols, for example in the hydrogenation of aldehydes from Roelen's oxosynthesis.

Particularly preferred APG-I are not alkoxylated (a1=0), for example $C_8$ and/or $C_9$ alkyl polyglucoside with a DP of 1.4, 1.5 or 1.6, more particularly $C_8$ alkyl polyglucoside with a DP of 1.5 ($C_8$ alkyl-1,5-glucoside).

Alkyl polyglycosides are obtainable, for example, under the names of APG®, Plantaren®, Plantacare® and Glucopon® from Cognis Deutschland GmbH and from Cognis Corporation (USA).

The content of one or more $C_{4-9}$ alkyl polyglycosides is normally 0.01 to 50% by weight, preferably 0.1 to 20% by weight, more preferably 0.5 to 10% by weight, most preferably 1 to 5% by weight and, in one most particularly preferred embodiment, 1.5 to 2% by weight, for example 1.6, 1.7, 1.8 or 1.9% by weight.

Other Surfactants

Besides the short-chain $C_{4-9}$ alkyl polyglycosides essential to the invention, the composition according to the invention may contain one or more surfactants from the group of nonionic, anionic, amphoteric and cationic surfactants.

The total surfactant content is normally 0.01 to 50% by weight, preferably 0.1 to 30% by weight, more preferably 0.5 to 20% by weight, most preferably 1 to 10% by weight and, in one most particularly preferred embodiment, 2 to 5% by weight, for example 3 or 4% by weight. The very high levels of up to 50% by weight can be reached in concentrated or highly concentrated embodiments and normally call for corresponding dilution before use.

The content by weight of short-chain $C_{4-9}$ alkyl polyglycoside (APG-I) essential to the invention, based on the total surfactants, preferably based on the total nonionic surfactants and more preferably based on the total alkyl polyglycosides, is normally 10 to 100%, preferably 20 to 90%, more preferably 30 to 80%, most preferably 40 to 70% and, in one most particularly preferred embodiment, 50 to 65%. In one particular embodiment of the invention, the content by weight of APG-I, based on the total surfactants, preferably based on the total nonionic surfactants and more preferably based on the total alkyl polyglycosides, is at least and more particularly above 50%.

Other Nonionic Surfactants

Suitable nonionic surfactants are, for example, other alkyl polyglycosides, $C_{6-22}$ alkyl alcohol polyglycol ethers and nitrogen-containing surfactants or even sulfosuccinic acid $C_{1-12}$ alkyl esters and mixtures thereof. Other nonionic surfactants in the context of the invention are alkoxylates, such as alkyl phenol polyglycol ethers, polyglycol ethers, end-capped polyglycol ethers, mixed ethers and hydroxy mixed ethers and also fatty acid polyglycol esters and fatty acid polyglycol ethers. Suitable polyglycol ethers (polyalkylene glycols, polyglycols) are, above all, polyethylene glycols (polymeric ethylene oxide) and polypropylene glycols (polymeric propylene oxide) and block polymers and block copolymers thereof.

The composition according to the invention contains one or more other nonionic surfactants, more particularly other alkyl polyglycosides, in a quantity—based on the composition—of typically 0 to 30% by weight, preferably 0.01 to 20% by weight, more preferably 0.1 to 10% by weight, most preferably 0.5 to 4% by weight and, in one most particularly preferred embodiment, 1 to 1.5% by weight, for example 1.1, 1.2, 1.3 or 1.4% by weight.

Other alkyl polyglycosides

In one preferred embodiment, the composition according to the invention contains one or more long-chain $C_{10-22}$ alkyl polyglycosides (APG-II) in addition to the short-chain $C_{4-9}$ alkyl polyglycosides essential to the invention (APG-I). In one particular embodiment of the invention, the composition contains only alkyl polyglycosides as surfactants.

The long-chain alkyl polyglycosides (APG-II) preferably correspond to general formula II:

$$R^2O(AO)_{a2}[G]_{x2} \quad (II)$$

in which
- $R^2$ is a linear or branched, saturated or unsaturated alkyl group containing 10 to 22, preferably 10 to 20, more preferably 10 to 18, most preferably 11 to 16 and, in one most particularly preferred embodiment, 12 to 14 carbon atoms,
- [G] is a glycosidic sugar unit, more particularly a glucose unit,
- x2 is a number of 1 to 10, preferably 1.1 to 3, more preferably 1.2 to 2, most preferably 1.3 to 1.8 and, in one most particularly preferred embodiment, 1.4 to 1.6,
- AO is a $C_{2-4}$ alkyleneoxy group, preferably an ethyleneoxy and/or propyleneoxy group and more preferably an ethyleneoxy group and a2 stands for the average degree of alkoxylation of 0 to 20, preferably 0 to 10, more preferably 0 to 5 and most preferably 0.

Apart from the different number of carbon atoms in the alkyl group, the foregoing observations on the APG-I apply equally to the APG-II.

The alkyl group $R^2$ may be derived from primary alcohols containing 10 to 22 carbon atoms. Typical examples are capric alcohol, undecyl alcohol, lauryl alcohol, myristyl alcohol, cetyl alcohol, palmitoleyl alcohol, stearyl alcohol, isostearyl alcohol, oleyl alcohol, elaidyl alcohol, petroselinyl alcohol, arachidyl alcohol, gadoleyl alcohol, behenyl alcohol and erucyl alcohol and mixtures thereof or the technical mixtures containing them which are obtained as linear alcohols, for example in the hydrogenation of technical fatty acid methyl esters, or as branched alcohols, for example in the hydrogenation of aldehydes from Roelen's oxosynthesis. The alkyl or alkenyl group $R^2$ is preferably derived from capric alcohol, undecyl alcohol, lauryl alcohol, myristyl alcohol and cetyl alcohol and mixtures thereof, more particularly from capric alcohol and/or undecyl alcohol.

Particularly preferred APG-II are also not alkoxylated (a2=0), for example $C_{10}$ and/or $C_{11}$ alkyl polyglucoside with a DP of 1.4, 1.5 or 1.6, more particularly $C_{10}$ alkyl polyglucoside with a DP of 1.5 ($C_{10}$ alkyl-1,5-glucoside).

Preferred mixtures of APG-I and APG-II contain $C_{6-9}$ APG-I and $C_{10-16}$ APG II, more particularly $C_{8/9}$ APG-I and $C_{10-14}$ APG-II and most preferably $C_{8/9}$ APG-I and $C_{10-12}$ APG-II, for example $C_{6/8}$ APG-I and $C_{10/12}$ APG-II, $C_8$ APG-I and $C_{10}$ APG-II, $C_{8/9}$ APG-I and $C_{10-12}$ APG-II, $C_9$ APG-I and $C_{10/11}$ APG-II or $C_9$ APG-I and $C_{10}$ APG-II ("-" stands for "to"; "/" stands for "and"; i.e. "$C_{10-12}$" stands for "$C_{10}$ to $C_{12}$" whereas "$C_{6/8}$" stands for "$C_6$ and $C_8$" and does not include "$C_7$").

A suitable mixture of APG-I and APG-II contains—based on the weight of the mixture—about 21% $C_9$ APG-I, 45% $C_{10}$ APG-II and 33% $C_{11}$ APG-II and in all about 1% $C_8$ APG-I and $C_{12}$ APG-II. Such a mixture with a DP degree of 1.4 is obtainable as APG® 300 or Plantaren® 300 and—with a DP degree of 1.6—as APG® 300 or Plantaren® 300 from Cognis Deutschland GmbH (DE) or from Cognis Corporation (US).

A preferred mixture of APG-I and APG-II contains—based on the weight of the mixture—about 0 to 2% $C_{4/6}$ APG-I, 55 to 63% $C_8$ APG-I, 33 to 43% $C_{10}$ APG-II and 0 to 7% $C_{12}$ APG-II. Such a mixture with a DP degree of 1.4 is obtainable as APG® 200 or Plantacare® 700, with a DP degree of 1.5 as APG®, Plantacare® 220 or Glucopon® 215 and with a DP degree of 1.6 as APG® 225, Plantacare® 800 or Glucopon® 225 from Cognis Deutschland GmbH (DE) or from Cognis Corporation (US). A mixture with a DP degree of 1.5 is particularly preferred.

Alkyl Alcohol Polyglycol Ethers $C_{6-22}$ alkyl alcohol polypropylene glycol/polyethylene glycol ethers are preferred known nonionic surfactants. They may be described by formula RO—$(CH_2CH(CH_3)O)_p$—$(CH_2CH_2O)_e$—H, in which R is a linear or branched, aliphatic alkyl and/or alkenyl group containing 6 to 22, preferably 8 to 18 and more preferably 10 to 16 carbon atoms, p is 0 or a number of 1 to 3 and e is a number of 1 to 20.

The $C_{6-22}$ alkyl alcohol polyglycol ethers corresponding to the above formula may be obtained by addition of propylene oxide and/or ethylene oxide onto alkyl alcohols, preferably onto oxoalcohols, the branched-chain primary alcohols obtainable by the oxosynthesis, or onto fatty alcohols, more particularly onto fatty alcohols. Typical examples are polyglycol ethers corresponding to the above formula, in which R is an alkyl group containing 8 to 18 carbon atoms, p=0 to 2 and e is a number of 2 to 7. Preferred representatives are, for example $C_{10-14}$ fatty alcohol+1PO+6EO ether (p=1, e=6), $C_{12-16}$ fatty alcohol+5.5 EO (p=0, e=5.5), $C_{12-18}$ fatty alcohol+7EO ether (p=0, e=7) and isodecanol +6EO (R=isomer mixture of $C_{10}$ oxoalcohol radicals, p=0, e=6) and mixtures thereof. In particular mixtures, at least one representative corresponding to the above formula with a linear alkyl chain R is combined with at least one representative corresponding to the above formula with a branched alkyl chain R, for example $C_{12-16}$ fatty alcohol+5.5EO and isodecanol+6EO. In this case, the linear alkyl chain preferably contains more carbon atoms than the branched alkyl chain. $C_8$ fatty alcohol+1.2PO+8.4EO, $C_{8-10}$ fatty alcohol+5EO, $C_{12-14}$ fatty alcohol+6EO $C_{12-14}$ fatty alcohol+3EO and mixtures thereof are particularly preferred. Nonionic surfactants and alkyl alcohol polyglycol ethers in particular produce an increase in the volume of the lower phase.

End-capped $C_{6-22}$ alkyl alcohol polyglycol ethers, i.e. compounds in which the free OH group in the above formula is etherified, may also be used. The end-capped $C_{6-22}$ alkyl alcohol polyglycol ethers may be obtained by relevant methods of preparative organic chemistry. Preferably, $C_{6-22}$ alkyl alcohol polyglycol ethers are reacted with alkyl halides, more especially butyl or benzyl chloride, in the presence of bases. Typical examples are mixed ethers corresponding to formula II, in which $R^1$ is a technical fatty alcohol moiety, preferably a $C_{12/14}$ cocoalkyl moiety, p=0 and e=5 to 10, which are end-capped with a butyl group.

Nitrogen-containing Nonionic Surfactants

Suitable nitrogen-containing nonionic surfactants are, for example, amine oxides, fatty acid polyhydroxyamides, for example glucamides, and ethoxylates of alkyl amines, vicinal diols and/or carboxylic acid amides containing alkyl groups with 10 to 22 carbon atoms and preferably 12 to 18 carbon atoms. The degree of ethoxylation of these compounds is generally between 1 and 20 and preferably between 3 and 10. Ethanolamide derivatives of alkanoic acids containing 8 to 22 carbon atoms and preferably 12 to 16 carbon atoms are preferred. Particularly suitable compounds include lauric acid, myristic acid and palmitic acid monoethanolamides.

Amine Oxides

Amine oxides suitable for the purposes of the invention include alkyl amine oxides, more particularly alkyl dimethyl amine oxides, alkylamidoamine oxides and alkoxyalkyl amine oxides. Preferred amine oxides correspond to the formula $R^1R^2R^3N^+$—$O^-$— in which $R^1$ is a saturated or unsaturated $C_{6-22}$ alkyl group, preferably a $C_{8-18}$ alkyl group, more preferably a saturated $C_{10-16}$ alkyl group, for example a saturated $C_{8-14}$ alkyl group which, in the alkylamidoamine oxides, is attached to the nitrogen atom N via a carbonylamidoalkylene group —CO—NH—$(CH_2)_z$— and, in the alkoxyalkyl amine oxides, via an oxa-alkylene group —O—$(CH_2)_z$— where z is a number of 1 to 10, preferably 2 to 5 and more preferably 3, and $R^2$ and $R^3$ independently of one another represent an optionally hydroxysubstituted $C_{1-4}$ alkyl group such as, for example, a hydroxyethyl group, more particularly a methyl group.

Examples of suitable amine oxides are the following compounds identified by their INCI names: Almondamidopropylamine Oxide, Babassuamidopropylamine Oxide, Behenamine Oxide, Cocamidopropyl Amine Oxide, Cocamidopropylamine Oxide, Cocamine Oxide, Coco-Morpholine Oxide, Decylamine Oxide, Decyltetradecylamine Oxide, Diaminopyrimidine Oxide, Dihydroxyethyl $C_{8-10}$ Alkoxypropylamine Oxide, Dihydroxyethyl $C_{9-11}$ Alkoxypropylamine Oxide, Dihydroxyethyl $C_{12-15}$ Alkoxypropylamine Oxide, Dihydroxyethyl Cocamine Oxide, Dihydroxyethyl Lauramine Oxide, Dihydroxyethyl Stearamine Oxide, Dihydroxyethyl Tallowamine Oxide, Hydrogenated Palm Kernel Amine Oxide, Hydrogenated Tallowamine Oxide, Hydroxyethyl Hydroxypropyl $C_{12-15}$ Alkoxypropylamine Oxide, Isostearamidopropylamine Oxide, Isostearamidopropyl Morpholine Oxide, Lauramidopropylamine Oxide, Lauramine Oxide, Methyl Morpholine Oxide, Milkamidopropyl Amine Oxide, Minkamidopropylamine Oxide, Myristamidopropylamine Oxide, Myristamine Oxide, Myristyl/Cetyl Amine Oxide, Oleamidopropylamine Oxide, Oleamine Oxide, Olivamidopropylamine Oxide, Palmitamidopropylamine Oxide, Palmitamine Oxide, PEG-3 Lauramine Oxide, Potassium Dihydroxyethyl Cocamine Oxide Phosphate, Potassium Trisphosphonomethylamine Oxide, Sesamidopropylamine Oxide, Soyamidopropylamine Oxide, Stearamidopropylamine Oxide, Stearamine Oxide, Tallowamidopropylamine Oxide, Tallowamine Oxide, Undecylenamido-propylamine Oxide und Wheat Germamidopropylamine Oxide. A preferred amine oxide is, for example, Cocamine Oxide (N-cocoalkyl-N,N-dimethylamine oxide), Dihydroxyethyl Tallowamine Oxide (N-tallowalkyl-N,N-dihydroxyethyl amine oxide) and/or Cocamidopropylamine Oxide (cocoamidopropyl amine oxide), more particularly Cocamidopropylamine Oxide.

Polyhydroxyfatty Acid Amides

Other suitable surfactants are polyhydroxyfatty acid amides corresponding to formula (III):

(III)

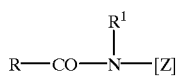

in which RCO is an aliphatic acyl group containing 6 to 22 carbon atoms, $R^1$ is hydrogen, an alkyl or hydroxyalkyl group containing 1 to 4 carbon atoms and [Z] is a linear or branched polyhydroxyalkyl group containing 3 to 10 carbon atoms and 3 to 10 hydroxyl groups. The polyhydroxyfatty acid amides are known substances which may normally be obtained by reductive amination of a reducing sugar with ammonia, an alkylamine or an alkanolamine and subsequent acylation with a fatty acid, a fatty acid alkyl ester or a fatty acid chloride.

The group of polyhydroxyfatty acid amides also includes compounds corresponding to formula (IV):

(IV)

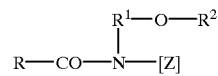

in which R is a linear or branched alkyl or alkenyl group containing 7 to 12 carbon atoms, $R^1$ is a linear, branched or cyclic alkyl group or an aryl group containing 2 to 8 carbon atoms and $R^2$ is a linear, branched or cyclic alkyl group or an aryl group or an oxyalkyl group containing 1 to 8 carbon atoms, $C_{1-4}$ alkyl or phenyl groups being preferred, and [Z] is a linear polyhydroxyalkyl group, of which the alkyl chain is substituted by at least two hydroxyl groups, or alkoxylated, preferably ethoxylated or propoxylated, derivatives of that group.

[Z] is preferably obtained by reductive amination of a reduced sugar, for example glucose, fructose, maltose, lactose, galactose, mannose or xylose. The N-alkoxy- or N-aryloxy-substituted compounds may then be converted into the required polyhydroxyfatty acid amides by reaction with fatty acid methyl esters in the presence of an alkoxide as catalyst, for example in accordance with the teaching of International patent application WO-A-95/07331.

Anionic Surfactants

Suitable anionic surfactants are normally at least one linear or branched, saturated or unsaturated alkyl or acyl group containing 6 to 22 carbon atoms or a derivative thereof and at least one anionic head group such as, for example, aliphatic sulfates such as fatty alcohol sulfates, fatty alcohol ether sulfates, dialkyl ether sulfates and monoglyceride sulfates, aliphatic sulfonates such as alkane sulfonates, olefin sulfonates, ether sulfonates, n-alkylether sulfonates, ester sulfonates and lignin sulfonates, alkyl benzene sulfonates, fatty acid cyanamides, sulfosuccinic acid esters, fatty acid isethionates, acylaminoalkane sulfonates (fatty acid taurides), fatty acid sarcosinates, ether carboxylic acids and alkyl (ether) phosphates. Particularly suitable anionic surfactants are $C_{8-18}$ alkyl sulfates, $C_{8-18}$ alkyl ether sulfates, i.e. the sulfation products of the above-described alkyl alcohol polyglycol ethers, and/or $C_{8-18}$ alkyl benzenesulfonates, more particularly dodecyl benzenesulfonate, but also $C_{8-18}$ alkanesulfonates, $C_{8-18}$ α-olefin sulfonates, sulfonated $C_{8-18}$ fatty acids, $C_{8-22}$ carboxylic acid amide ether sulfates, sulfosuccinic acid mono-$C_{1-12}$-alkyl esters, $C_{8-18}$ alkyl polyglycol ether carboxylates, $C_{8-18}$ N-acyl taurides, $C_{8-18}$ N-sarcosinates and $C_{8-18}$ alkyl isethionates and mixtures thereof.

The anionic surfactants are normally used in the form of their alkali metal and alkaline earth metal salts, more particularly sodium, potassium and magnesium salts, ammonium and mono-, di-, tri- and tetra-alkyl ammonium salts and—in the case of the sulfonates—in the form of their corresponding acid, for example dodecyl benzenesulfonic acid. Where sulfonic acid is used, it is normally neutralized in situ to the above-mentioned salts with one or more corresponding bases, for example alkali metal and alkaline earth metal hydroxides, more particularly sodium, potassium and magnesium hydroxide, ammonia or mono-, di-, tri- or tetra-alkylamine.

Soaps

The compositions according to the invention may also contain one or more soaps, i.e. salts of saturated or unsaturated $C_{6-22}$ carboxylic acids, and/or the corresponding acids, for their foam-suppressing properties. Preferred salts are the alkali metal salts, more particularly the sodium and/or potassium salts and most preferably the potassium salts. Preferred $C_{6-22}$ carboxylic acids are saturated and/or unsaturated, particularly monounsaturated, fatty acids containing 6 to 22, preferably 8 to 22, more preferably 10 to 20 and most preferably 12 to 18 carbon atoms, for example oleic acid, stearic acid, tallow acid, lauric acid and/or erucic acid (Z-13-docosenoic acid). However, soaps regularly give rise to solubility problems and unwanted clouding resulting therefrom, particularly if the water used is relatively hard.

If one or more anionic surfactants, including the soaps, are used, their content in the composition according to the invention, based on the composition, is normally 0.01 to 30% by weight, preferably 0.1 to 20% by weight, more preferably 0.1 to 20% by weight, most preferably 0.5 to 10% by weight and, in one most particularly preferred embodiment, 1 to 5% by weight, for example 2% by weight.

In one preferred embodiment, however, the composition contains hardly any anionic surfactants including soaps in accordance with the quantity data shown above and, in one particularly preferred embodiment, is entirely free from soaps and even from anionic surfactants.

Amphotetic Surfactants

Suitable amphoteric surfactants (zwifterionic surfactants) are, for example, betaines, alkylamidoalkyl amines, alkyl-substituted amino acids, acylated amino acids and biosurfactants, of which the betaines are preferred for the purposes of the invention.

If one or more amphoteric surfactants are used, their content in the composition according to the invention, based on the composition, is normally 0.01 to 30% by weight, preferably 0.1 to 20% by weight, more preferably 0.5 to 10% by weight and most preferably 1 to 5% by weight Betaines Suitable betaines are the alkyl betaines, the alkylamidobetaines, the imidazolinium betaines, the sulfobetaines (INCI Sultaines) and the phosphobetaines and preferably correspond to the formula $(R^A)(R^B)(R^C)N^+CH_2COO^-$, where $R^A$ is a $C_{8-25}$ and preferably $C_{10-21}$ alkyl group optionally interrupted by hetero atoms or hetero atom groups and $R^B$ and $R^C$ may the same or different and represent $C_{1-13}$ alkyl groups, more particularly $C_{10-18}$ alkyldimethyl carboxymethyl betaines and $C_{11-17}$ alkylamidopropyl dimethyl carboxymethyl betaines, or to formula A:

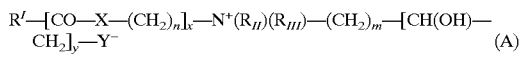

in which $R^1$ is a saturated or unsaturated $C_{6-22}$ alkyl group, preferably a $C_{8-18}$ alkyl group and more preferably a saturated $C_{10-16}$ alkyl group, for example a saturated $C_{12-14}$ alkyl group, X is NH, $NR^{IV}$ with the $C_{1-4}$ alkyl group $R^{IV}$, O or S, n is a number of 1 to 10, preferably 2 to 5 and more preferably 3, x is 0 or 1, preferably 1, $R^{II}$ and $R^{III}$ independently of one another represent an optionally hydroxysubstituted $C_{1-4}$ alkyl group such as, for example, a hydroxyethyl group, but especially a methyl group, m is a number of 1 to 4, more particularly 1, 2 or 3, y is 0 or 1 and Y is $COO$, $SO_3$, $OPO(OR^V)O$ or $P(O)(OR^V)O$, where $R^V$ is a hydrogen atom H or a $C_{1-4}$ alkyl group.

The alkyl betaines and alkylamidobetaines, betaines corresponding to formula A with a carboxylate group $(Y^-=COO^-)$, are also known as carbobetaines.

Preferred amphoteric surfactants are the alkyl betaines corresponding to formula A1, the alkylamidobetaines corresponding to formula A2, the sulfobetaines corresponding to formula A3 and the amidosulfobetaines corresponding to formula A4:

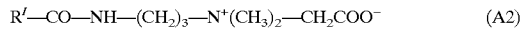

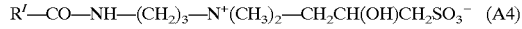

in which $R^I$ is as defined for formula A.

Particularly preferred amphoteric surfactants are the carbobetaines and more particularly the carbobetaines corresponding to formulae A1 and A2, the alkylamidobetaines corresponding to formula A2 being most particularly preferred.

Examples of suitable betaines and sulfobetaines are the following compounds identified by their INCI names: Almondamidopropyl Betaine, Apricotamidopropyl Betaine, Avocadamidopropyl Betaine, Babassuamidopropyl Betaine, Behenamidopropyl Betaine, Behenyl Betaine, Betaine, Canolamidopropyl Betaine, Capryl/Capramidopropyl Betaine, Carnitine, Cetyl Betaine, Cocamidoethyl Betaine, Cocamidopropyl Betaine, Cocamidopropyl Hydroxysultaine, Coco-Betaine, Coco-Hydroxysultaine, Coco/Oleamidopropyl Betaine, Coco-Sultaine, Decyl Betaine, Dihydroxyethyl Oleyl Glycinate, Dihydroxyethyl Soy Glycinate, Dihydroxyethyl Stearyl Glycinate, Dihydroxyethyl Tallow Glycinate, Dimethicone Propyl PG-Betaine, Erucamidopropyl Hydroxysultaine, Hydrogenated Tallow Betaine, Isostearamidopropyl Betaine, Lauramidopropyl Betaine, Lauryl Betaine, Lauryl Hydroxysultaine, Lauryl Sultaine, Milkamidopropyl Betaine, Minkamidopropyl Betaine, Myristamidopropyl Betaine, Myristyl Betaine, Oleamidopropyl Betaine, Oleamidopropyl Hydroxysultaine, Oleyl Betaine, Olivamidopropyl Betaine, Palmamidopropyl Betaine, Palmitamidopropyl Betaine, Palmitoyl Carnitine, Palm Kernelamidopropyl Betaine, Polytetrafluoroethylene Acetoxypropyl Betaine, Ricinoleamidopropyl Betaine, Sesamidopropyl Betaine, Soyamidopropyl Betaine, Stearamidopropyl Betaine, Stearyl Betaine, Tallowamidopropyl Betaine, Tallowamidopropyl Hydroxysultaine, Tallow Betaine, Tallow Dihydroxyethyl Betaine, Undecylenamidopropyl Betaine und Wheat Germamidopropyl Betaine. Ein preferred amphoteric surfactant is Cocamidopropyl Betaine (Cocoamidopropylbetaine). A particularly preferred amphoteric surfactant is Capryl/Capramidopropyl Betaine (CAB) which is commercially obtainable, for example, as Tegotens® B 810 from Th. Goldschmidt AG.

Alkylamido Alkylamines

The alkylamido alkylamines (INCI Alkylamido Alkylamines) are amphoteric surfactants corresponding to formula B:

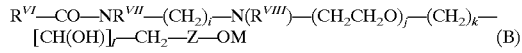

in which $R^{VI}$ is a saturated or unsaturated $C_{6-22}$ alkyl group, preferably a $C_{8-18}$ alkyl group and more preferably a saturated $C_{10-16}$ alkyl group, for example a saturated $C_{12-14}$ alkyl group, $R^{VII}$ is a hydrogen atom H or a $C_{1-4}$ alkyl group, preferably H, i is a number of 1 to 10, preferably 2 to 5, more preferably 2 or 3, $R^{VIII}$ is a hydrogen atom H or $CH_2COOM$ (for M, see below), j is a number of 1 to 4, preferably 1 or 2, more preferably 1, k is a number of 0 to 4, preferably 0 or 1, l is 0 or 1, k being 1 where l is 1, Z is $CO$, $SO_2$, $OPO(OR^{12})$ or $P(O)(OR^{12})$ where $R^{12}$ is a $C_{1-4}$ alkyl group or M (see below) and M is a hydrogen atom, an alkali metal, an alkaline earth metal or a protonated alkanolamine, for example protonated mono-, di- or triethanolamine.

Preferred representatives correspond to formulae B1 to B4:

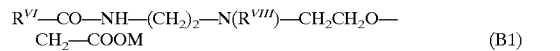  (B1)

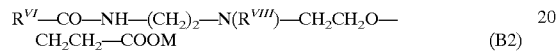  (B2)

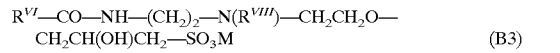  (B3)

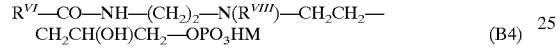  (B4)

in which $R^{VI}$, $R^{VIII}$ and M are as defined for formula B.

Examples of alkylamido alkylamines are the following compounds identified by their INCI names: Cocoamphodipropionic Acid, Cocobetainamido Amphopropionate, DEA-Cocoamphodipropionate, Disodium Caproamphodiacetate, Disodium Caproamphodipropionate, Disodium Capryloamphodiacetate, Disodium Capryloamphodipropionate, Disodium Cocoamphocarboxyethylhydroxypropylsulfonate, Disodium Cocoamphodiacetate, Disodium Cocoamphodipropionate, Disodium Isostearoamphodiacetate, Disodium Isostearoamphodipropionate, Disodium Laureth-5 Carboxyamphodiacetate, Disodium Lauroamphodiacetate, Disodium Lauroamphodipropionate, Disodium Oleoamphodipropionate, Disodium PPG-2-Isodeceth-7 Carboxyamphodiacetate, Disodium Stearoamphodiacetate, Disodium Tallowamphodiacetate, Disodium Wheatgermamphodiacetate, Lauroamphodipropionic Acid, Quaternium-85, Sodium Caproamphoacetate, Sodium Caproamphohydroxypropylsulfonate, Sodium Caproamphopropionate, Sodium Capryloamphoacetate, Sodium Capryloamphohydroxypropylsulfonate, Sodium Capryloamphopropionate, Sodium Cocoamphoacetate, Sodium Cocoamphohydroxypropylsulfonate, Sodium Cocoamphopropionate, Sodium Cornamphopropionate, Sodium Isostearoamphoacetate, Sodium Isostearoamphopropionate, Sodium Lauroamphoacetate, Sodium Lauroamphohydroxypropylsulfonate, Sodium Lauroampho PG-Acetate Phosphate, Sodium Lauroamphopropionate, Sodium Myristoamphoacetate, Sodium Oleoamphoacetate, Sodium Oleoamphohydroxypropylsulfonate , Sodium Oleoamphopropionate, Sodium Ricinoleoamphoacetate, Sodium Stearoamphoacetate, Sodium Stearoamphohydroxypropylsulfonate, Sodium Stearoamphopropionate, Sodium Tallamphopropionate, Sodium Tallowamphoacetate, Sodium Undecylenoamphoacetate, Sodium Undecylenoamphopropionate, Sodium Wheat Germamphoacetate und Trisodium Lauroampho PG-Acetate Chloride Phosphate.

Alkyl-substituted amino acids

According to the invention, preferred alkyl-substituted amino acids (INCI Alkyl-Substituted Amino Acids) are monoalkyl-substituted amino acids corresponding to formula C:

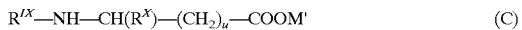  (C)

in which $R^{IX}$ is a saturated or unsaturated $C_{6-22}$ alkyl group, preferably a $C_{1-18}$ alkyl group and more preferably a saturated $C_{10-16}$ alkyl group, for example a saturated $C_{12-14}$ alkyl group, $R^x$ is a hydrogen atom H or a $C_{1-4}$ alkyl group, preferably H, u is a number of 1 to 4, preferably 0 or 1, more preferably 1, and M' is a hydrogen atom, an alkali metal, an alkaline earth metal or a protonated alkanolamine, for example protonated mono-, di- or triethanolamine, alkyl-substituted imino acids corresponding to formula D:

  (D)

in which $R^{XI}$ is a saturated or unsaturated $C_{6-22}$ alkyl group, preferably a $C_{8-18}$ alkyl group and more preferably a saturated $C_{10-16}$ alkyl group, for example a saturated $C_{12-14}$ alkyl group, v is a number of 1 to 5, preferably 2 or 3, more preferably 2, and M" is a hydrogen atom, an alkali metal, an alkaline earth metal or a protonated alkanolamine, for example protonated mono-, di- or triethanolamine; M" in the two carboxy groups may have the same meaning or two different meanings, for example may be hydrogen and sodium or just sodium, and mono- or dialkyl-substituted natural amino acids corresponding to formula E:

  (E)

in which $R^{XII}$ is a saturated or unsaturated $C_{6-22}$ alkyl group, preferably a $C_{8-18}$ alkyl group and more preferably a saturated $C_{10-16}$ alkyl group, for example a saturated $C_{12-14}$ alkyl group, $R^{XIII}$ is a hydrogen atom or an optionally hydroxy- or amine-substituted $C_{1-4}$ alkyl group, for example a methyl, ethyl, hydroxyethyl or aminopropyl group, $R^{XIV}$ is the residue of one of the 20 natural α-amino acids $H_2NCH(R^{XIV})COOH$ and M'" is a hydrogen atom, an alkali metal, an alkaline earth metal or a protonated alkanolamine, for example protonated mono-, di- or triethanolamine.

Particularly preferred alkyl-substituted amino acids are the aminopropionates corresponding to formula $C_1$:

  ($C_1$)

in which $R^{IX}$ and M' have the same meanings as in formula C.

Examples of alkyl-substituted amino acids are the following compounds identified by their INCI names: Aminopropyl Laurylglutamine, Cocaminobutyric Acid, Cocaminopropionic Acid, DEA-Lauraminopropionate, Disodium Cocaminopropyl Iminodiacetate, Disodium Dicarboxyethyl Cocopropylenediamine, Disodium Lauriminodipropionate, Disodium Steariminodipropionate, Disodium Tallowiminodipropionate, Lauraminopropionic Acid, Lauryl Aminopropylglycine, Lauryl Diethylenediaminoglycine, Myristaminopropionic Acid, Sodium $C_{12-15}$ Alkoxypropyl Iminodipropionate, Sodium Cocaminopropionate, Sodium Lauraminopropionate, Sodium Lauriminodipropionate, Sodium Lauroyl Methylaminopropionate, TEA-Lauraminopropionate und TEA-Myristamino-propionate.

Acylated Amino Acids

Acylated amino acids are amino acids, more particularly the 20 natural α-amino acids, which carry the acyl group $R^{XV}CO$ of a saturated or unsaturated fatty acid $R^{XV}COOH$ at the amino nitrogen atom ($R^{XV}$ being a saturated or unsaturated $C_{6-22}$ alkyl group, preferably a $C_{8-18}$ alkyl group and more preferably a saturated $C_{10-16}$ alkyl group, for example a saturated $C_{12-14}$ alkyl group). The acylated amino acids may also be used in the form of an alkali metal salt, an alkaline earth metal salt or alkanolammonium salt, for example mono-, di- or triethanolamine. Examples of acylated amino acids are the acyl derivatives known collectively by the INCI name of Amino Acids, for example Sodium Cocoyl Glutamate, Lauroyl Glutamic Acid, Capryloyl Glycine oder Myristoyl Methylalanine.

Complexing Agents

In addition, the composition according to the invention preferably contains one or more complexing agents in a quantity, based on the composition, of typically 0.01 to 20% by weight, preferably 0.1 to 10% by weight, more preferably 0.5 to 10% by weight, most preferably 1 to 5% by weight and, in one most particularly preferred embodiment, 1.5 to 4% by weight.

Complexing agents (INCI Chelating Agents), also known as sequestering agents, are ingredients which are capable of complexing and inactivating metal ions to prevent them adverse affecting the stability and appearance of the composition, for example clouding, and in particular to guarantee a clear solution, even where the composition is used with hard water. On the one hand, it is important in this regard to complex the calcium and magnesium ions of water hardness which are incompatible with many ingredients. On the other hand, complexing of the ions of heavy metals, such as iron or copper, delays the oxidative decomposition of the final composition. In addition, complexing agents support the cleaning effect.

Suitable complexing agents are, for example, alkali metal citrates, gluconates, nitrilotriacetates, carbonates and bicarbonates, more particularly sodium and potassium citrate, gluconate and nitrilotriacetate. They also include the salts of glutaric acid, succinic acid, adipic acid, tartaric acid and benzenehexacarboxylic acid and aminotrimethylene phosphonic acid, hydroxyethane-1,1-diphosphonic acid, 1-aminoethane-1,1-diphosphonic acid, ethylenediamine tetra(methylene phosphonic acid), diethylenetriamine penta (methylenephosphonic acid), 2-phosphonobutane-1,2,4-tricarboxylic acid, phosphonates and phosphates, for example the sodium salts of methanediphosphonic acid, the pentasodium triphosphate known as sodium tripolyphosphate or sodium hexametaphosphate such as, for example, a mixture of condensed orthophosphates with an average degree of condensation of about 12.

Suitable complexing agents are the following compounds identified by their INCI names (some of which have already been mentioned): Aminotrimethylene Phosphonic Acid, Beta-Alanine Diacetic Acid, Calcium Disodium EDTA, Citric Acid, Cyclodextrin, Cyclohexanediamine Tetraacetic Acid, Diammonium Citrate, Diammonium EDTA, Diethylenetriamine Pentamethylene Phosphonic Acid, Dipotassium EDTA, Disodium Azacycloheptane Diphosphonate, Disodium EDTA, Disodium Pyrophosphate, EDTA, Etidronic Acid, Galactaric Acid, Gluconic Acid, Glucuronic Acid, HEDTA, Hydroxypropyl Cyclodextrin, Methyl Cyclodextrin, Pentapotassium Triphosphate, Pentasodium Aminotrimethylene Phosphonate, Pentasodium Ethylenediamine Tetramethylene Phosphonate, Pentasodium Pentetate, Pentasodium Triphosphate, Pentetic Acid, Phytic Acid, Potassium Citrate, Potassium EDTMP, Potassium Gluconate, Potassium Polyphosphate, Potassium Trisphosphonomethylamine Oxide, Ribonic Acid, Sodium Chitosan Methylene Phosphonate, Sodium Citrate, Sodium Diethylenetriamine Pentamethylene Phosphonate, Sodium Dihydroxyethylglycinate, Sodium EDTMP, Sodium Gluceptate, Sodium Gluconate, Sodium Glycereth-1 Polyphosphate, Sodium Hexametaphosphate, Sodium Metaphosphate, Sodium Metasilicate, Sodium Phytate, Sodium Polydimethylglycinophenolsulfonate, Sodium Trimetaphosphate, TEA-EDTA, TEA-Polyphosphate, Tetrahydroxyethyl Ethylenediamine, Tetrahydroxypropyl Ethylenediamine, Tetrapotassium Etidronate, Tetrapotassium Pyrophosphate, Tetrasodium EDTA, Tetrasodium Etidronate, Tetrasodium Pyrophosphate, Tripotassium EDTA, Trisodium Dicarboxymethyl Alaninate, Trisodium EDTA, Trisodium HEDTA, Trisodium NTA und Trisodium Phosphate.

Preferred complexing agents are the citrates, more particularly alkali metal citrates, especially sodium citrate and/or potassium citrate and most particularly potassium citrate. In the context of the present invention, the citrates are the salts of 3x-deprotonated citric acid unless otherwise specifically stated. However, the mono- and dihydrogen citrates may also be used in accordance with the invention.

The complexing salts mentioned may also be used in the form of their corresponding acids or bases which are then partly or completely neutralized, depending on the pH value to be established, for example citric acid in the form of its monohydrate citric acid-1 $H_2O$ instead of citrate.

pH Value

The pH of the composition according to the invention may be adjusted to a value within a wide range from strongly acidic via neutral to strongly alkaline and is normally in the range from 1 to 14, preferably in the range from 2 to 13, more preferably in the range from 3 to 12, most preferably in the range from 3.5 to 11 and, in one most particularly preferred embodiment, in the range from 4 to 10.5.

In a preferred acidic embodiment, the pH value of the composition according to the invention is in the range from 2 to 6, preferably in the range from 2.5 to 5.5, more preferably in the range from 3 to 5, most preferably in the range from 3.5 to 4.5 and, in one most particularly preferred embodiment, is pH 4.

In a neutral embodiment, the pH of the composition according to the invention is in the range from 6 to 8 and preferably in the range from 6.5 to 7.5 and more preferably is 7.

In a particularly preferred alkaline embodiment, the pH value of the composition according to the invention is in the range from 8 to 13, preferably in the range from 9 to 12, more preferably in the range from 9.5 to 11.5, most preferably in the range from 10 to 11 and, in one most particularly preferred embodiment, is pH 10.5.

To adjust, control and/or stabilize the pH value, the composition according to the invention preferably contains one or more pH regulators (INCI pH Adjusters), more particularly from the group of acids, bases and buffering agents and mixtures thereof, in a quantity—based on the composition—of normally 0.01 to 15% by weight, preferably 0.1 to 10% by weight, more preferably 0.5 to 5% by weight, most preferably 1 to 4% by weight and, in one most particularly preferred embodiment, 1.5 to 3% by weight.

Suitable pH regulators are, for example, the following compounds identified by their INCI names: Acetic Acid, Acetyl Mandelic Acid, Adipic Acid, Aluminum Triformate, 2-Aminobutanol, Aminoethyl Propanediol, Aminomethyl Propanediol, Aminomethyl Propanol, Ammonia, Ammonium Bicarbonate, Ammonium Carbamate, Ammonium Carbonate, Ammonium Glycolate, Ammonium Hydroxide, Ammonium Phosphate, Ascorbic Acid, Azelaic Acid, Benzoic Acid, Bis-Hydroxyethyl Tromethamine, Calcium Citrate, Calcium Dihydrogen Phosphate, Calcium Hydroxide, Calcium Oxide, Citric Acid, Diethanolamine, Diethanolamine Bisulfate, Diisopropanolamine, Diisopropylamine, Dimethyl MEA, Dioleoyl Edetolmonium Methosulfate, Dipotassium Phosphate, Dipropylenetriamine, Disodium Phosphate, Disodium Pyrophosphate, Disodium Tartrate, Ethanolamine, Ethanolamine HCl, Formic Acid, Fumaric Acid, Galacturonic Acid, Glucoheptonic Acid, Glucosamine HCl, Glucuronic Acid, Glycolic Acid, Glyoxylic Acid, Guanidine Carbonate, Hydrochloric Acid, Imidazole, Isopropanolamine, Isopropylamine, Ketoglutaric Acid, Lactic Acid, Lactobionic Acid, Lithium Hydroxide, Magnesium Carbonate, Magnesium Carbonate Hydroxide, Magnesium Hydroxide, Magnesium Oxide, Maleic Acid, Malic Acid, Malonic Acid, Metaphosphoric Acid, Methylethanolamine, Methylglucamine, Mixed Isopropanolamines, Monosodium Citrate, Morpholine, Oxalic Acid, Pentapotassium Triphosphate, Pentasodium Triphosphate, Phosphoric Acid, Potassium Bicarbonate, Potassium Biphthalate, Potassium Borate, Potassium Carbonate, Potassium Citrate, Potassium Hydroxide, Potassium Phosphate, Propionic Acid, Quinic Acid, Ribonic Acid, Sebacic Acid, Sodium Aluminate, Sodium Bicarbonate, Sodium Bisulfate, Sodium Borate, Sodium Carbonate, Sodium Citrate, Sodium Fumarate, Sodium Hydroxide, Sodium Oxide, Sodium Sesquicarbonate, Sodium Silicate, Sodium Succinate, Sodium Trimetaphosphate, Strontium Hydroxide, Succinic Acid, Sulfuric Acid, Tartaric Acid, Tetrapotassium Pyrophosphate, Tetrasodium Pyrophosphate, Triethanolamine, Triisopropanolamine, Trisodium Phosphate, Tromethamine, Vinegar.

Preferred pH regulators are citric acid (as acid), hydroxides (as bases) and the citrates, carbonates and hydrogen carbonates (as buffering agents), the hydroxides and/or buffering agents preferably being alkali metal salts, more particularly sodium and/or potassium salts and most particularly potassium salts.

A number of compounds act both as complexing agents and as pH regulators and, by virtue of this dual functionality, are preferably used as such because they provide for particularly efficient formulation of the composition according to the invention.

Accordingly, in one particularly preferred embodiment, the composition according to the invention contains citric acid and alkali metal hydroxide— or corresponding citrate—together with alkali metal carbonate and/or hydrogen carbonate, more particularly citric acid and potassium hydroxide together with potassium carbonate.

In another particular embodiment of the composition according to the invention, the content of carbonate ions $CO_3^{2-}$, based on the composition, is 0.01 to less than 1% by weight, preferably 0.1 to 0.9% by weight, more preferably 0.3 to 0.8% by weight and most preferably 0.5 to 0.7% by weight, for example 0.6% by weight.

Solvents

The water-based composition according to the invention contains water as primary solvent in a quantity, based on the composition, of normally 40 to 99.99% by weight, preferably 50 to 99% by weight, more preferably 60 to 95% by weight, most preferably 70 to 92% by weight and, in one most particularly preferred embodiment, 80 to 90% by weight, for example 85 or 89% by weight. The very low water contents down to only 40% by weight— or even lower—may be reached in concentrated or highly concentrated embodiments and normally necessitate corresponding dilution before use.

Organic Solvents

In addition, the composition according to the invention preferably contains one or more organic solvents in a quantity—based on the composition—of 0.01 to 30% by weight, preferably 0.1 to 20% by weight, more preferably 1 to 15% by weight, most preferably 2 to 10% by weight and, in one most particularly preferred embodiment, 3 to 7% by weight, for example 5% by weight.

Suitable organic solvents are, for example, saturated or unsaturated, preferably saturated, branched or unbranched $C^{1-20}$ hydrocarbons, preferably $C_{2-15}$ hydrocarbons, containing one or more hydroxy groups, preferably one hydroxy group, and optionally one or more ether functions C—O—C, i.e. oxygen atoms interrupting the carbon atom chain.

Preferred solvents are the $C_{1-6}$ alcohols, more particularly ethanol, n-propanol and/or isopropanol, preferably ethanol, polyols, such as glycerol, and the $C_{2-6}$ alkylene glycols and poly-$C_{2-3}$-alkylene glycol ethers—optionally etherified on one side with a $C_{1-6}$ alkanol—containing on average 1 to 9 identical or different, preferably identical, alkylene glycol groups per molecule, more particularly the poly-$C_{2-3}$-alkylene glycol ethers etherified on one side with a $C_{1-6}$ alkanol and containing on average 1 to 9 and preferably 2 to 3 ethylene or propylene glycol groups, for example PPG-2 Methyl Ether (dipropylene glycol monomethyl ether). Particularly preferred organic solvents are the $C_{1-6}$ alcohols ethanol, n-propanol or isopropanol, more particularly ethanol.

Other suitable organic solvents are the following compounds identified by their INCI names (some of which have already been mentioned): Alcohol (Ethanol), Buteth-3, Butoxydiglycol, Butoxyethanol, Butoxyisopropanol, Butoxypropanol, n-Butyl Alcohol, t-Butyl Alcohol, Butylene Glycol, Butyloctanol, Diethylene Glycol, Dimethoxydiglycol, Dimethyl Ether, Dipropylene Glycol, Ethoxydiglycol, Ethoxyethanol, Ethyl Hexanediol, Glycol, Hexanediol, 1,2,6-Hexanetriol, Hexyl Alcohol, Hexylene Glycol, Isobutoxypropanol, Isopentyldiol, Isopropyl Alcohol (iso-Propanol), 3-Methoxybutanol, Methoxydiglycol, Methoxyethanol, Methoxyisopropanol, Methoxymethylbutanol, Methoxy PEG-10, Methylal, Methyl Alcohol, Methyl Hexyl Ether, Methylpropanediol, Neopentyl Glycol, PEG4, PEG-6, PEG-7, PEG-8, PEG-9, PEG-6 Methyl Ether, Pentylene Glycol, PPG-7, PPG-2-Buteth-3, PPG-2 Butyl Ether, PPG-3 Butyl Ether, PPG-2 Methyl Ether, PPG-3 Methyl Ether, PPG-2 Propyl Ether, Propanediol, Propyl Alcohol (n-Propanol), Propylene Glycol, Propylene Glycol Butyl Ether, Propylene Glycol Propyl Ether, Tetrahydrofurfuryl Alcohol, Trimethylhexanol.

Monomeric or homo- or heteropolymeric, more particularly monomeric and homo-, di- and trimeric $C_{2-4}$ alkylene glycols etherified or esterified with aliphatic or aromatic alcohols, for example methanol, ethanol, n-propanol, n-butanol, tert.-butanol or phenol, or carboxylic acids, for example acetic or carbonic acid, are marketed, for example, under the name of Dowanol® by Dow Chemical and under the names of Arcosolv® and Arconate® by Arco Chemical, such as the products listed below under their INCI names (*International Dictionary of Cosmetic Ingredients* published by The Cosmetic, Toiletry and Fragrance Association (CTFA)), for example butoxy diglycol (Dowanol® DB), methoxydiglycol (Dowanol® DM), PPG-2 Methyl Ether (Dowanol® DPM), PPG-2 Methyl Ether Acetate (Dowanol® DPMA), PPG-2 Butyl Ether (Dowanol® DPnB), PPG-2 Propyl Ether (Dowanol® DPnP), Butoxyethanol (Dowanol® EB), Phenoxyethanol (Dowanol® EPh), Methoxyisopropanol (Dowanol® PM), PPG-1 Methyl Ether Acetate (Dowanol® PMA), Butoxyisopropanol (Dowanol® PnB), Propylene Glycol Propyl Ether (Dowanol® PnP), Phenoxyisopropanol (Dowanol® PPh), PPG-3 Methyl Ether (Dowanol® TPM) and PPG-3 Butyl Ether (Dowanol® TPnB) and Ethoxyisopropanol (Arcosolv® PE), tert.-Butoxyisopropanol (Arcosol® PTB), PPG-2 tert.-butyl ether (Arcosolv® DPTB) and Propylenecarbonate (Arconate® PC), of which butoxy isopropanol (dipropylene glycol-n-butyl ether, Dowanol® PnB) and particularly PPG-2 Methyl Ether (dipropylene glycol methyl ether, Dowanol® DPM) are preferred.

Antimicrobial Agents

To control microorganisms, the cleaning composition according to the invention may contain one or more antimicrobial agents. Depending on the antimicrobial spectrum and the action mechanism, antimicrobial agents are classified as bacteriostatic agents and bactericides, fungistatic agents and fungicides, etc. Important representatives of these groups are, for example, benzalkonium chlorides, alkylaryl sulfonates, halophenols and phenol mercuriacetate. In the present context, the expressions "antimicrobial activity" and "antimicrobial agent" have the usual meanings as defined, for example, by K. H. Wallhäußer in "Praxis der Sterilisation, Desinfektion—Konservierung:Keimidentifizierung—Betriebshygiene" (5th Edition, Stuttgart/New York: Thieme, 1995), any of the substances with antimicrobial activity described therein being usable. Suitable antimicrobial agents are preferably selected from the groups of alcohols, amines, aldehydes, antimicrobial acids and salts thereof, carboxylic acid esters, acid amides, phenols, phenol derivatives, diphenyls, diphenylalkanes, urea derivatives, oxygen and nitrogen acetals and formals, benzamidines, isothiazolines, phthalimide derivatives, pyridine derivatives, antimicrobial surface-active compounds, guanidines, antimicrobial amphoteric compounds, quinolines, 1,2-dibromo-2,4-dicyanobutane, iodo-2-propyl butyl carbamate, iodine, iodophores, peroxo compounds, halogen compounds and mixtures of the above.

The antimicrobial agent may be selected from ethanol, n-propanol, i-propanol, butane-1,3-diol, phenoxyethanol, 1,2-propylene glycol, glycerol, undecylenic acid, benzoic acid, salicylic acid, dihydracetic acid, o-phenylphenol, N-methyl morpholine acetonitrile (MMA), 2-benzyl-4-chlorophenol, 2,2'-methylene-bis-(6-bromo4-chlorophenol), 4,4'-dichloro-2'-hydroxydiphenyl ether (Dichlosan), 2,4,4'-trichloro-2'-hydroxydiphenyl ether (Trichlosan), chlorohexidine, N-(4-chlorophenyl)-N-3,4-dichlorophenyl)-urea, N,N'-(1,10-decanediyldi-1-pyridinyl-4-ylidene)-bis-(1-octanamine)-dihydrochloride, N,N'-bis-(4-chlorophenyl)-3,12-diimino-2,4,11,13-tetraazatetradecane diimidoamide, glucoprotamines, antimicrobial surface-active quaternary compounds, guanidines, including the bi- and polyguanidines such as, for example, 1,6-bis-(2-ethylhexylbiguanidohexane)-dihydrochloride, 1,6-di-($N_1$, $N_1$'-phenyldiguanido-$N_5$,$N_5$')-hexane tetrahydrochloride, 1,6-di-($N_1$,$N_1$'-phenyl-$N_1$,$N_1$-methyldiguanido-$N_5$,$N_5$')-hexane dihydrochloride, 1,6-di-($N_1$,$N_1$'-o-chlorophenyldiguanido-$N_5$,$N_5$')-hexane dihydrochloride, 1,6-di-($N_1$,$N_1$'-2,6-dichlorophenyldiguanido-$N_5$,$N_5$')-hexane dihydrochloride, 1,6-di-[$N_1N_1$'-β-(p-methoxyphenyl)-diguanido-$N_5$,$N_5$']-hexane dihydrochloride, 1,6-di-($N_1N_1$'-α-methyl-β-phenyldiguanido-$N_5$,$N_5$')-hexane dihydrochloride, 1,6-di-($N_1$,$N_1$'-p-nitrophenyidiguanido-$N_5$,$N_5$')-hexane dihydrochloride, ω:ω'-di-($N_1$,$N_1$'-phenyldiguanido-$N_5$,$N_5$')-di-n-propyl ether dihydrochloride, ω:ω-di-($N_1$,$N_1$'-p-chlorophenyldiguanido-$N_5$,$N_5$')-di-n-propyl ether tetrahydrochloride, 1,6-di-($N_1$,$N_1$'-2,4-dichlorophenyldiguanido-$N_5$,$N_5$')-hexane tetrahydrochloride, 1,6-di-($N_1$,$N_1$'-p-methylphenyldiguanido-$N_5$,$N_5$')-hexanedihydrochloride, 1,6-di-($N_1$,$N_1$'-2,4,5-trichlorophenyldiguanido-$N_5$,$N_5$')-hexane tetrahydrochloride, 1,6-di-[$N_1$,$N_1$'-α-(p-chlorophenyl)-ethyldiguanido-$N_5$,$N_5$']-hexane dihydrochloride, ω:ω-di-($N_1$,$N_1$'-p-chlorophenyidiguanido-$N_5$,$N_5$')-m-xylene dihydrochloride, 1,12-di-($N_1$, $N_1$'-p-chlorophenyidiguanido-$N_5$, $N_5$')-dodecane dihydrdochloride, 1,10-di-($N_1$,$N_1$'-phenyldiguanido-$N_5$, $N_5$')-decane tetrahydrochloride, 1,12-di-($N_1$,$N_1$'-phenyldiguanido-$N_5$,$N_5$')-dodecane tetrahydrochloride, 1,6-di-($N_1$,$N_1$'-o-chlorophenyldiguanido-$N_5$,$N_5$')-hexane dihydrochloride, 1,6-di-($N_1$,$N_1$'-o-chlorophenyidiguanido-$N_5$,$N_5$')-hexane tetrahydrochloride, ethylene-bis-(1-tolylbiguanide), ethylene-bis-(p-tolylbiguanide), ethylene-bis-(3,5-dimethylphenylbiguanide), ethylene-bis-(p-tert.amylphenylbiguanide), ethylene-bis-(nonylphenylbiguanide), ethylene-bis-(phenylbiguanide), ethylene-bis-(N-butylphenylbiguanide), ethylene-bis-(2,5-diethoxyphenylbiguanide), ethylene-bis-(2,4-dimethylphenylbiguanide), ethylene-bis-(o-diphenylbiguanide), ethylene-bis-(mixed-amylnaphthylbiguanide), N-butylethylene-bis-(phenylbiguanide), trimethylene-bis-(o-tolylbiguanide), N-butyltrimethylene-bis-(phenylbiguanide) and the corresponding salts, such as acetates, gluconates, hydrochlorides, hydrobromides, citrates, bisulfites, fluorides, polymaleates, N-cocoalkyl sarcosinates, phosphites, hypophosphites, perfluorooctanoates, silicates, sorbates, salicylates, maleates, tartrates, fumarates, ethylenediamine tetraacetates, iminodiacetates, cinnamates, thiocyanates, arginates, pyromellitates, tetracarboxybutyrates, benzoates, glutarates, monofluorophosphates, perfluoropropionates and mixtures thereof. Halogenated xylene and cresol derivatives, such as p-chloro-m-cresol or p-chloro-m-xylene, and natural antimicrobial agents of vegetable origin (for example from spices or herbs), animal and microbial origin are also suitable. Preferred antimicrobial agents are antimicrobial surface-active quaternary compounds, a natural antimicrobial agent of vegetable origin and/or a natural antimicrobial agent of animal origin and, most preferably, at least one natural antimicrobial agent of vegetable origin from the group comprising caffeine, theobromine and theophylline and essential oils, such as eugenol, thymol and geraniol, and/or at least one natural antimicrobial agent of animal origin from the group comprising enzymes, such as protein from milk, lysozyme and lactoperoxidase and/or at least one antimicrobial surface-active quaternary compound containing an ammonium, sulfonium, phosphonium, iodonium or arsonium group, peroxo compounds and chlorine compounds. Substances of microbial origin, so-called bacteriozines, may also be used.

The quaternary ammonium compounds (QUATS) suitable as antimicrobial agents have the general formula $(R^1)(R^2)(R^3)(R^4)N^+X^-$, in which $R^1$ to $R^4$ may be the same or different and represent $C_{1-22}$ alkyl groups, $C_{7-28}$ aralkyl groups or heterocyclic groups, two or—in the case of an aromatic compound, such as pyridine—even three groups together with the nitrogen atom forming the heterocycle, for example a pyridinium or imidazolinium compound, and $X^-$ represents halide ions, sulfate ions, hydroxide ions or similar anions. In the interests of optimal antimicrobial activity, at least one of the substituents preferably has a chain length of 8 to 18 and, more preferably, 12 to 16 carbon atoms.

QUATS can be obtained by reaction of tertiary amines with alkylating agents such as, for example, methyl chloride, benzyl chloride, dimethyl sulfate, dodecyl bromide and also ethylene oxide. The alkylation of tertiary amines with one long alkyl chain and two methyl groups is particularly simple. The quaternization of tertiary amines containing two long chains and one methyl group can also be carried out under mild conditions using methyl chloride. Amines containing three long alkyl chains or hydroxy-substituted alkyl chains lack reactivity and are preferably quaternized with dimethyl sulfate.

Suitable QUATS are, for example, benzalkonium chloride (N-alkyl-N,N-dimethylbenzyl ammonium chloride, CAS No. 8001-54-5), benzalkon B (m,p-dichlorobenzyl dimethyl-$C_{12}$-alkyl ammonium chloride, CAS No. 58390-78-6), benzoxonium chloride (benzyldodecyl-bis-(2-hydroxyethyl)-ammonium chloride), cetrimonium bromide (N-hexadecyl-N,N-trimethyl ammonium bromide, CAS No. 57-09-0), benzetonium chloride (N,N-dimethyl-N-[2-[2-[p-(1,1,3,3-tetramethylbutyl)-phenoxy]-ethoxy]-ethyl]-benzyl ammonium chloride, CAS No. 121-54-0), dialkyl dimethyl ammonium chlorides, such as di-n-decyldimethyl ammonium chloride (CAS No. 7173-51-5-5), didecyidimethyl ammonium bromide (CAS No. 2390-68-3), dioctyl dimethyl ammonium chloride, 1-cetylpyridinium chloride (CAS No. 123-03-5) and thiazoline iodide (CAS No. 15764-48-1) and mixtures thereof. Particularly preferred QUATS are the benzalkonium chlorides containing $C_{8-18}$ alkyl groups, more particularly $C_{12-14}$ alkyl benzyl dimethyl ammonium chloride.

Benzalkonium halides and/or substituted benzalkonium halides are commercially obtainable, for example, as Barquat® from Lonza, Marquat® from Mason, Variquat® from Witco/Sherex and Hyamine® from Lonza and as Bardac® from Lonza. Other commercially obtainable antimicrobial agents are N-(3-chloroallyl)-hexaminium chloride, such as Dowicide® and Dowicil® from Dow, benzethonium chloride, such as Hyamine® 1622 from Rohm & Haas, methyl benzethonium chloride, such as Hyamine® 10× from Rohm & Haas, cetyl pyridinium chloride, such as cepacolchloride from Merrell Labs.

In one particularly preferred embodiment, the composition according to the invention contains benzoic acid and/or derivatives thereof, more particularly salicylic acid or salts thereof, as the one or more antimicrobial agents.

The antimicrobial agents are used in quantities of normally 0.0001% by weight to 5% by weight, preferably 0.001% by weight to 2% by weight, more preferably 0.005% by weight to 1% by weight, most preferably 0.01% by weight to 0.5% by weight and, in one most particularly preferred embodiment, 0.05% by weight to 0.2% by weight. The particular quantity used will be selected by the expert with the particular antimicrobial agent or mixture and the antimicrobial effect to be obtained in mind so that, in particular embodiments of the invention, a content of antimicrobial agents outside the range mentioned may also be appropriate.

Perfumes

The composition also contains one or more perfumes, typically in the form of one or more perfume oils, in a quantity of normally 0.001 to 1% by weight, preferably 0.005 to 0.5% by weight, more preferably 0.01 to 0.1% by weight and most preferably 0.02 to 0.05% by weight.

Another advantage of the invention is that a certain perfume intensity is achieved in the composition according to the invention even with unusually small amounts of perfume oil. This is presumably attributable to the short-chain alkyl polyglycoside essential to the invention.

Other Ingredients

Depending on the formulation of the composition according to the invention, one or more auxiliaries and additives typical of the particular application envisaged—more particularly from the group of solubilizers, hydrotropes, emulsifiers, enzymes, preservatives, corrosion inhibitors, colorants and viscosity regulators, more particularly thickeners—may be present as further ingredients.

Use

In a fourth embodiment, the present invention relates to a process for cleaning fruit, vegetables and/or meat in which the fruit, vegetables and/or meat to be cleaned are first treated with a composition according to any of the preceding composition claims in undiluted or diluted form, after which the composition is removed again.

To carry out the treatment, the composition may either be applied undiluted, preferably by spraying, or the produce to be cleaned may be introduced into a cleaning bath prepared by diluting the composition with water. Typical cleaning baths contain 0.1 to 10 ml, preferably 0.5 to 5 ml and more preferably 1 to 3.5 ml of the composition per 100 ml of bath.

The composition is preferably removed again by rinsing with running water. Alternate means of removal include immersion, spraying, or wiping with water or an aqueous fluid.

EXAMPLES

Compositions E1 to E3 according to the invention and comparison composition $C_1$ were prepared. Their ingredients and pH values are shown in Table 1 below.

TABLE 1

| Composition [% by weight] | E1 | E2 | E3 | C1 |
|---|---|---|---|---|
| $C_8$ alkyl-1,5-glucoside | 1.8[a] | 1.8[a] | 1.8[a] | — |
| $C_{10}$ alkyl-1,5-glucoside | 1.2[b] | 1.2[b] | 1.2[b] | — |
| Erucic acid | — | — | 2 | — |
| Oleic acid | — | — | — | 2.4 |
| Citric acid · 1 $H_2O$ | 1.6 | 2.5 | 1.6 | 0.6 |
| KOH | 1.1 | 1.1 | 1.4 | 0.5 |
| $K_2CO_3$ | 1.5 | — | 1.5 | — |
| $NaHCO_3$ | — | — | — | 0.7 |
| Ethanol | 4.8 | 4.8 | 4.8 | 2 |
| Glycerol | — | — | — | 2 |
| Salicylic acid | — | 1.0 | — | — |
| Perfume oil | 0.05 | 0.05 | 0.05 | + |
| Water | to 100 | to 100 | to 100 | to 100 |
| pH value | 10.5 | 4.0 | 10.5 | 11.6 |
| Residue [%] | 32 | 25 | 54 | 22 |

[a] contains at most 0.06% by weight $C_{4/6}$ alkyl-1,5-glycoside
[b] contains at most 0.2% by weight $C_{12}$ alkyl-1,5-glycoside Another comparison composition $C_2$ containing 3% by weight of a $C_{12-16}$ alkyl-1,4-glucoside was prepared similarly to E1. Whereas the above-mentioned compositions were obtained as clear solutions, $C_2$ was cloudy even in undiluted form.

Cleaning Performance

The compositions were tested for cleaning performance.

To this end, waxed apples ("Jona Gold") were cleaned with water and with the four compositions. The apples were then rinsed with pentane and quantities of 10 g of the extracts obtained were concentrated in a stream of nitrogen. The concentrated extracts were then silylated and quantified by HT gas chromatography. The sum of the peak areas on the gas chromatograms obtained are shown in Table 1 as the percentage residue, based on the 100% value for the apple pretreated with water.

All the compositions performed considerably better than the tap water normally used for this purpose in the home.

Sensitivity to Water Hardness

The sensitivity of the compositions to water hardness was also tested.

To this end, quantities of 1 and 3.5 ml of the particular composition were diluted to 100 ml with water differing in hardness (0, 2, 4, 8, 16, 24, 32, 40, 48 and 64° d=German hardness) and the resulting cleaning liquid was visually evaluated.

With the comparison composition $C_1$, a clear liquid was only obtained with water of 0° d; even water of 2° d led to clouding which increased with increasing water hardness. Finally, the dilutions with water of 40° d or higher produced a flocculent sediment which, in the case of the 1 ml dilution with water of 32° d, was even noticeable in the liquid.

Compositions E1 and E2 produced clear liquids even when diluted with the water of 64° d. Composition E3 also produced a clear liquid in the case of the 1 ml dilution with water of 16° d and, with water of 48° d, led to a translucently hazy liquid which resembled the liquid obtained in the case of the same dilution of $C_1$ with water of only 2° d. The 3.5 ml dilution of E3 with water of 16° d resulted in a slightly opaque liquid and, only with water of 64° d, led to a milky liquid which resembled the liquid obtained in the case of the same dilution of $C_1$ with water of only 8° d.

Accordingly, the compositions according to the invention are far less sensitive to water hardness.

What is claimed is:

1. A method of cleaning fruit, vegetables, or meat, comprising the steps of applying a cleaning effective amount of one or more $C_{4-9}$ alkyl polyglycosides to a piece of fruit, vegetable, or meat in need of cleaning of soil, residue, coating, or any other undesirable substance, and removing the one or more $C_{4-9}$ alkyl polyglycosides and the of soil, residue, coating, or other undesirable substance from the fruit, vegetable, or meat by an appropriate means.

2. A water-based composition for cleaning fruit, vegetables, or meat, comprising one or more $C_{4-9}$ alkyl polyglycosides.

3. The composition of claim 2, comprising one or more additional surfactants.

4. The composition of claim 3, wherein the one or more additional surfactants comprise one or more nonionic surfactants.

5. The composition of claim 4, wherein the one or more additional surfactants comprise one or more $C_{10-22}$ alkyl polyglycosides.

6. The composition of claim 2, comprising no soaps.

7. The composition of claim 2, comprising no anionic surfactants.

8. The composition of claim 2, comprising one or more complexing agents.

9. The composition of claim 3, comprising one or more complexing agents.

10. The composition of claim 2, comprising one or more pH regulators.

11. The composition of claim 9, comprising one or more pH regulators.

12. The composition of claim 2, comprising one or more organic solvents.

13. The composition of claim 11, comprising one or more organic solvents.

14. The composition of claim 2, comprising one or more antimicrobial agents.

15. The composition of claim 13, comprising one or more antimicrobial agents.

16. The composition of claim 2, comprising one or more perfumes.

17. The composition of claim 15, comprising one or more perfumes.

18. The composition of claim 2, having a pH value of 1 to 14.

19. The composition of claim 2, having a pH value of 2 to 13.

20. The composition of claim 2, having a pH value of 3 to 12.

21. The composition of claim 2, having a pH value of 3.5 to 11.

22. The composition of claim 2, having a pH value of 4 to 10.5.

* * * * *

UNITED STATES PATENT AND TRADEMARK OFFICE
CERTIFICATE OF CORRECTION

PATENT NO. : 6,432,892 B2
DATED : August 13, 2002
INVENTOR(S) : Meine et al.

It is certified that error appears in the above-identified patent and that said Letters Patent is hereby corrected as shown below:

Title page,
Item [56], References Cited, FOREIGN PATENT DOCUMENTS, delete "WO98/07331", and insert therefor -- WO95/07331 --.

Column 21,
Line 46, after "the", delete "of".

Signed and Sealed this

Ninth Day of September, 2003

JAMES E. ROGAN
*Director of the United States Patent and Trademark Office*